United States Patent [19]
Brown et al.

[11] 3,981,191
[45] Sept. 21, 1976

[54] METHOD AND APPARATUS FOR THE ULTRASONIC MEASUREMENT OF THE FLOW VELOCITY OF FLUENT MEDIA

[75] Inventors: Alvin E. Brown, Claremont, Calif.; Niels Thun, Sonderborg, Denmark

[73] Assignee: Danfoss A/S, Nordborg, Denmark

[22] Filed: Aug. 11, 1975

[21] Appl. No.: 603,294

[30] Foreign Application Priority Data
July 5, 1975  Germany............................ 2530202

[52] U.S. Cl............................................... 73/194 A
[51] Int. Cl.² .......................................... G01F 1/66
[58] Field of Search .................................. 73/194 A

[56] References Cited
UNITED STATES PATENTS

| | | |
|---|---|---|
| 3,720,105 | 3/1973 | Cirulis............................... 73/194 A |
| 3,751,979 | 8/1973 | Ims ................................... 73/194 A |
| 3,780,577 | 12/1973 | Brown............................... 73/194 A |
| 3,818,757 | 6/1974 | Brown............................... 73/194 A |
| 3,894,431 | 7/1975 | Muston et al..................... 73/194 A |

*Primary Examiner*—Charles A. Ruehl

[57] ABSTRACT

Ultrasonic signals are transmitted alternately upstream and downstream in a fluent media. A reference signal timed to occur at the estimated time of arrival of the alternate signals is used to ascertain whether the actual signals arrive earlier or later than the reference signal. Control circuitry responsive to the early and late signals generates two signal levels associated with transmission direction which adjusts the time position of the reference signal until it coincides with the actual arrival times. One signal level is related to flow velocity. The other signal level is related to sound velocity in the fluent media.

20 Claims, 11 Drawing Figures

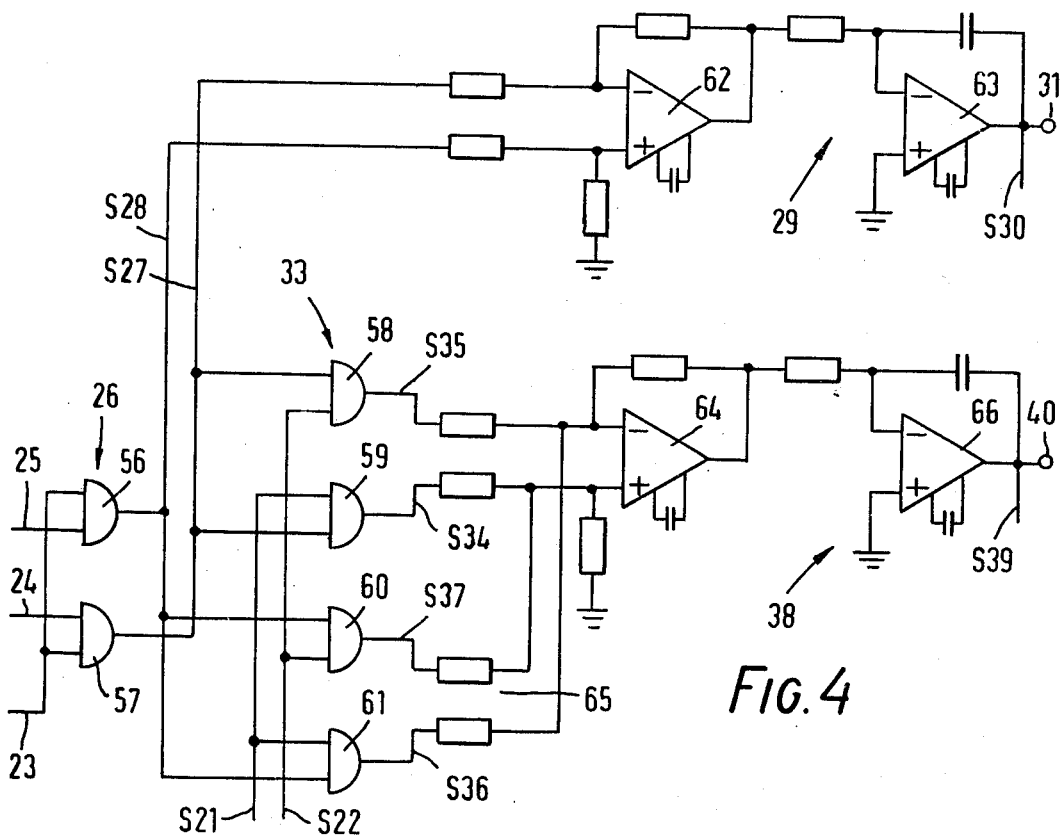
FIG.4
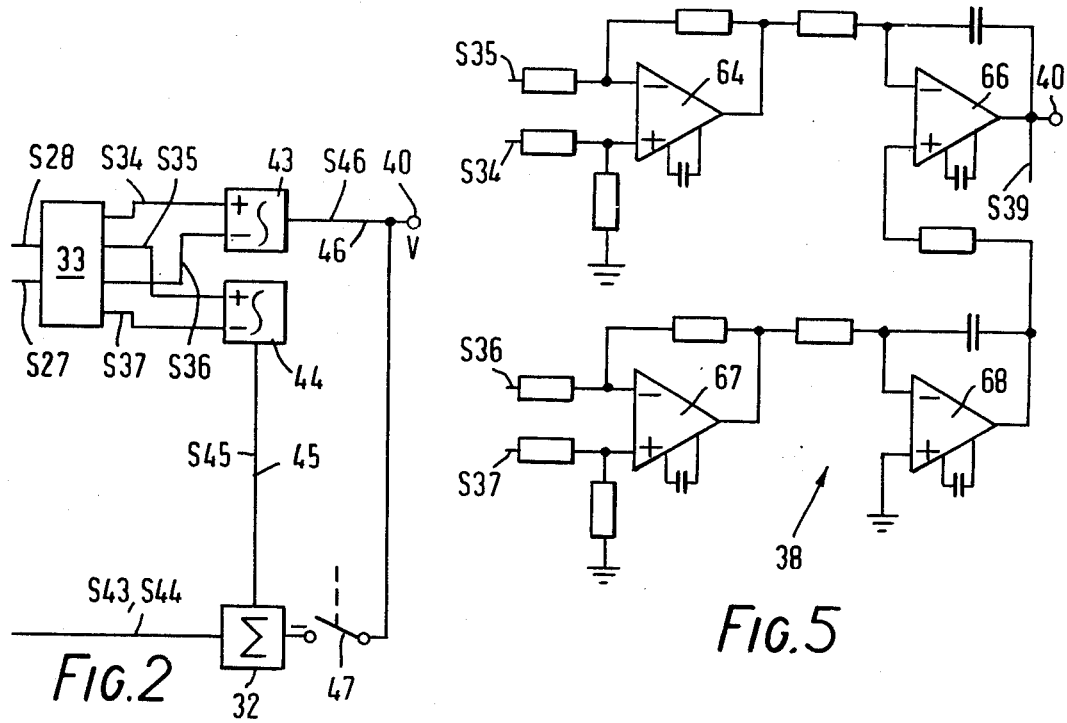
FIG.2
FIG.5

| | TRANSMIT | RECEIVE | | S30 $\frac{f_1+f_2}{2}$ | S39 $\frac{f_1-f_2}{2}$ | S43 $f_1$ | S44 $f_2$ |
|---|---|---|---|---|---|---|---|
| | | DOWNSTREAM | UPSTREAM | | | | |
| 1 | S17, $t_1$, $t_v$ | S13, S11 | S13, S11 | + | 0 | + | + |
| 2 | | | | − | 0 | − | − |
| 3 | | | | 0 | + | + | − |
| 4 | | | | 0 | − | − | + |
| 5 | | | | 0 | 0 | 0 | 0 |

\+ = RISES     − = FALLS     0 = UNCHANGED

*FIG. 11*

METHOD AND APPARATUS FOR THE ULTRASONIC MEASUREMENT OF THE FLOW VELOCITY OF FLUENT MEDIA

CROSS REFERENCE TO RELATED APPLICATIONS

Portions of this invention are disclosed in an application Ser. No. 602,918 filed Aug. 7, 1975 and entitled Apparatus For Determining The Arrival Time Of Alternating Signals by Alvin E. Brown.

BACKGROUND OF THE INVENTION

This invention relates to ultrasonic flowmeters and, more particularly, to method and apparatus for the ultrasonic measurement of the flow velocity of fluent media.

An ultrasonic measuring apparatus is known from German Specification 2,322,749, in which frequencies are generated which are a frequency $f_1$ on downstream measurement related to the downstream speed of sound and a frequency $f_2$ on upstream measurement related to the upstream speed of sound. From the instant of transmitting the ultrasonic signal, a predetermined number, for example 256, of output pulses of the oscillator are counted, whereupon a reference signal is transmitted. If it is found in a comparator that the ultrasonic signal received occurs earlier than the reference signal, the frequency of the oscillator is increased by means of a signal level generator in the form of an integrator, so that the timing of the reference signal is adjusted to the actual arrival time of the ultrasonic signal. If the ultrasonic signal received occurs later than the reference signal, the frequency of the oscillator is reduced. The frequencies $f_1$ and $f_2$ thus determined alternately are passed to a respective evaluating circuit, stored there until the arrival of the other frequency, and then processed to measuring data corresponding to the flow velocity or sonic velocity, respectively.

An apparatus of the kind referred to is known from U.S. Pat. No. 3,780,577, wherein a signal level generator is provided for both transmission directions, it being possible to transmit the early or late signals to the inputs of the signal level generator only if the associated logic elements simultaneously contain an upstream or a downstream signal, respectively. In this case, the signal level is also available in the respective other transmission direction during the measurement. By way of summation and subsequent integration of the signal level, one receives a voltage for controlling an oscillator of which the output frequency is selected as a measurement for the sonic velocity. The flow velocity is obtained by producing trapezoidal waves from the two signal levels. These trapezoidal waves are generated in a certain relationship to each other by means of switches, quick-acting integrators and comparators. In addition, the output frequency of the oscillator is stepped down to one quarter and modulated by the trapezoidal waves to produce the frequencies $f_1$ and $f_2$. The reference signal occurs after each 256 impulses of the frequencies $f_1$ or $f_2$.

Extraordinarily high requirements are placed on the accuracy of operation of these apparati because the transmission time differences are only $10^{-8}$ or $10^{-9}$ seconds for most applications. To achieve this accuracy, known apparati call for a considerable expenditure. This refers to, inter alia, certain circuit configurations, operational amplifiers of high quality and precision components. This tends to make the apparatus expensive.

The underlying object of the invention is to provide an ultrasonic measuring apparatus of the aforementioned kind having the desired measuring accuracy or even a greater measuring accuracy, particularly for the flow velocity, and which can be made considerably more cheaply as a result of using a simple circuit construction and normal components.

SUMMARY OF THE INVENTION

In a preferred embodiment, the apparatus includes at least one measuring path which is provided with two ultrasonic transducers, each of which have at least one component extending in the direction of flow and through which ultrasonic signals are transmitted alternately upsteam and downstream, comparator means on the receiving side for receiving on the one hand arrival signals associated with the time of receiving the ultrasonic signals and on the other hand reference signals delayed with respect to the transmission time and for delivering early and late signals when the arrival signals arrive earlier or later than each reference signal, respectively; a control circuit which, in logic elements, links to the early and late signals upstream and downstream signals occurring in dependence on the transmission direction and which contains at least two signal level generators controlled in relation thereto so as to produce two control signals associated with the transmission direction; and at least one timing generator controlled by the control signals for providing the reference signal.

In such apparatus, the transit time of an ultrasonic signal transmitted downstream along the measuring path is compared with the transit time of an ultrasonic signal transmitted upstream along the measuring path. The flow velocity of the medium is then proportional to the difference between, and the sonic velocity in the flowing medium is proportional to the sum of, the reciprocals of the transit time. In one embodiment the transit time is measured by counting a predetermined number of oscillations generated with a variable frequency oscillator, the flow velocity is proportional to the difference between, and the sonic velocity is proportional to the sum of, two frequencies $f_1$ and $f_2$ associated with the downstream measurement and upstream measurement, respectively.

The output of the first signal level generator and the output of the second signal level generator are respectively applied as main signal and auxiliary signal to an adder or summing circuit in which for at least one control signal the auxiliary signal is added to and/or subtracted from the main signal. A switch controlled by the transmission direction is provided by which two different delay periods are alternately made effective for the reference signal.

If only one time generator, e.g. an oscillator with series-connected counter is provided, the switch may be in the input for the auxiliary signal to the summating cirucit. This time generator is therefore alternately fed with an upstream control signal and a downstream control signal, so that the delayed reference signal can be adapted to the arrival time of the ultrasonic signal on upstream measurement or downstream measurement, respectively.

When using two time generators, the switch may be connected after at least a first section of these time generators. When using oscillators with a series-connected common counter, this switch can for example be disposed between the oscillators and the counter.

In such a construction of the apparatus, the auxiliary signal is a direct measure of the flow velocity. This auxiliary signal is effective in at least one of the two regulating circuits that are formed during the upstream measurement or downstream measurement. In these regulating circuits, the time of occurrence of the delayed reference signal is adjusted with high accuracy to the arrival time of the received ultrasonic signal. Even if inaccuracies occur within these regulating circuits as a result of simple circuit groups, cheaper components or the like, they are compensated by the function of the regulating circuit. Consequently the auxiliary signal and thus the measured flow velocity also have the desired accuracy independently of the quality of the components that are used.

To increase the accuracy, the auxiliary signal may be proportionally reducible at the input of or in the summating circuit. The auxiliary signal is therefore transmissible by the second signal level generator with a higher proportionality factor than the main signal from the first signal level generator. The second signal level generator therefore operates with a comparatively high output level. This is possible because the main signal and the auxiliary signal are produced separately and fed to the summating circuit through separate paths which could have different loop gains.

In one embodiment, the one control signal is formed by the main signal and the other control signal by the sum of or difference between the main signal and the auxiliary signal. If the transit time is measured by frequency formation, the main signal corresponds to the frequency $f_1$ or $f_2$ and the auxiliary signal to the difference between these frequencies so that the control signal alternately corresponds to $f_1$ or $f_2$. This can be achieved with a circuit in which the first signal level generator comprises an integrator for receiving early signals of one sign and late signals of the opposite sign at its input associated with one of the transmission directions, and in which the second signal level generator comprises an integrator for receiving early signals of one sign and late signals of the opposite sign at its output associated with the other transmission direction.

In a preferred second embodiment, the one control signal is formed by the sum of and the other control signal by the difference between the main signal and the auxiliary signal. This is because the main signal is a direct measurement for the sonic velocity in the flow. One can therefore derive both measuring values of principal interest directly from the regulating circuits and with high accuracy. With a time measurement on a frequency basis, the main signal corresponds to the mean value of the frequencies $f_1$ and $f_2$ and the auxiliary signal to half the difference between these two frequencies.

In a circuit that is particularly suitable in this connection, the first signal level generator comprises an integrator for receiving at its input all early signals of both transmission directions of one sign and all late signals of both transmission directions of the opposite sign, and the second signal level generator comprises an integrator for receiving at its input the early signals or late signals of both transmission directions, the signals of one transmission direction having one sign and the signals of the other transmission direction having the opposite sign. In this construction signals from the upstream measurement as well as the downstream measurement are evaluated in both signal level generators.

Since all early and late signals of both transmission directions are utilized to obtain the main signal, a very accurate main signal is obtained as a result of the high information content. All the early and late signals of both transmission directions can also be utilized for the auxiliary signal. This is achieved for example in that the second signal level generator comprises a main integrator and an additional integrator, the aditional integrator processing the signals not processed by the main integrator in the same way as the main integrator and the output of the additional integrator being connected to one input of the main integrator.

A simple circuitry is achieved if the second signal level generator comprises a correcting element through which the early signals and the late signals of the one transmission direction have the early signals and the late signals of the other transmission direction added to them before they are fed to the integrator.

In a preferred embodiment, it is insured that the control circuit is provided with a first row of two logic elements of which the outputs are occupied in dependence on the presence of the arrival signal and one early or late signal and connected on the one hand to the input circuit of the first integrator of the first signal level generator and on the other hand to the input of a second row of four logic elements which can additionally be fed with upstream or downstream signals in such a way that their outputs are associated with the early signals of the one transmission direction, the early signals of the other transmission direction, the late signals of the one transmission direction or the late signals of the other transmission direction. Two or four of the last-mentioned outputs then serve to feed the second signal level generator.

To the output of the second signal level generator there may be applied the input of an amplifier of which the output is connected through two incandescent diodes of opposite polarity disposed in parallel branches to a voltage reference point such as earth, one of the diodes possibly being in series with a Zener diode. This produces indicator means for indicating the measured flow direction by lighting up of one of the two incandescent diodes.

Further, the output of the first signal level generator may have applied to it through a full wave voltage limiter the input of an amplifier of which the output is connected through two parallel incandescent diodes of opposite polarity to a voltage reference point such as earth. In this case one of the incandescent diodes lights up when the sonic velocity exceeds the upper or lower limits of a permissible range.

According to the method of this invention, fluid flow rate and sound propagation velocity through a fluid are measured using upstream and downstream transducers by generating a transmit pulse, generating a reference pulse delayed in time to said transmit pulse, directing the transmit pulses alternately upstream and downstream of the flowing medium, receiving the transmitted pulses, comparing the phase of the received and reference pulses, generating logic signals in accordance with the early and late arrival of said received pulses relative to said reference pulses, obtaining the statistical average of all early and all late signals to provide a first signal level related to the sound speed in said medium, generating logic signals corresponding to the early and late arrival of signals relative to said reference signals correlated with the direction of transmission, obtaining the statistical average of at least one pair of early and late arrival signals to provide a second signal level related to fluid flow velocity of said medium, selectively subtracting and adding said first and second signal level for each of said upstream and downstream transmissions thereby to vary the delay time of said reference pulses for each of said upstream and downstream transmissions such that said reference pulses track the actual time of arrival of said transmitted pulses.

BRIEF DESCRIPTION OF THE DRAWINGS

The invention will now be described in more detail with reference to examples shown in the drawing, wherein:

FIG. 2 is a modification of part of the circuit;

FIG. 4 is an embodiment of the control circuit;

FIG. 5 is a modification of part of the control circuit;

FIG. 11 is a table of the corrections occurring in the FIGS. 1, 3 to 5 or 6 embodiments with the various combinations of upstream and downstream, early and late signals.

Figure 1:
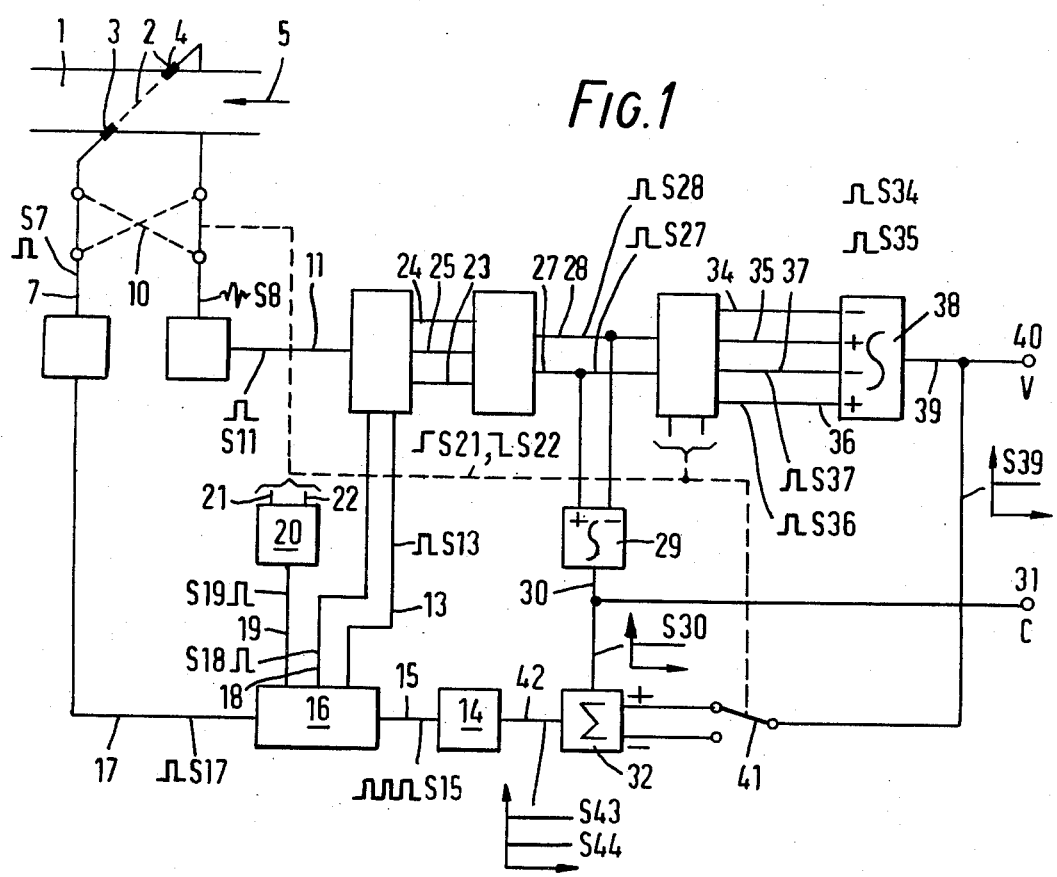
FIG. 1 is a diagrammatic circuit lay-out of a measuring apparatus according to the invention.

According to FIG. 1, a channel 1 contains an ultrasonic measuring path 2 which is defined by two ultrasonic transducers 3 and 4 and is disposed obliquely to the direction 5 of flow of the fluent medium through the channel 1. One transmission device 6 is able to pass to the transducer 3 through the line 7 a D.C. impulse S7, which shock excites the transducer at its resonant frequency so that it thereupon passes through the medium in the channel 1 an ultrasonic signal having a frequency of for example 1 MHz. This signal is received by the transducer 4 at the end of the transit time and converted to an electric signal S8 which is fed through a line 8 to receiver means 9. The lines 7 and 8 are interchangeable through a switch 10 so that the transducers 3 and 4 can serve alternately as ultrasonic transmitter and as ultrasonic receiver. Alternatively separate transmitters and receivers may be employed as described in U.S. Pat. No. 3,780,577. In the receiving means 9, a defined arrival signal S11 is obtained from the high frequency signal S8 by means of a zero crossover detector such as that described in U.S. Pat. No. 3,780,577; the signal S11 being passed through a line 11 to comparator means 12. These comparator means simultaneously receive through a line 13 a reference signal S13 with which the arrival signal S11 is compared on a time basis.

A voltage-controlled oscillator 14 may serve as time generator; it passes its output oscillations as an impulse chain S15 to a counter 16 through a line 15. On commencement of counting, this counter delivers a transmission signal S17 to the transmission means 6 through a line 17. At a predetermined counter content, e.g. 256 impulses, the reference signal S13 is delivered. At an earlier instant (before 256 impulses), e.g. 128 impulses, a receiver readiness signal S18 was passed through a line 18 to prepare the comparator means for measurement. Subsequent to measurement, e.g. 384 impulses, the receiver readiness signal S18 is terminated, thereby disabling the receiver and comparator and protecting against shock excitation during transmission. Finally a signal S19 is fed through a line 19 to a bistable transmission generator 20 which alternately delivers downstream signals S21 and upstream signals S22 through a pair of signal lines 21 and 22, the latter signals then switching the switch 10 over.

When an arrival signal S11 arrives in the comparator means 12, a signal of predetermined, constant amplitude and duration appears at the output 23. If this arrival signal S11 has arrived earlier than the reference signal S13, a signal appears at the output 24. If the arrival signal was determined later than the reference signal, a signal occurs at the output 25. A first row 26 of logic elements links these three output signals in such a way that in a line 27 an early signal S27 occurs having a constant amplitude and the same time duration as the signal occurring at output 23 and a late signal S28 occurs also having a constant amplitude and the same time duration as the signals occurring on outputs 23 and 25.

In an integrating signal level such as a generator integrator 29 all early signals S27 are integrated in one direction and all late signals S28 in the opposite. By way of convention, the + and − signs in the blocks 29 and 38 indicate the direction of integration of early signals S27 and late signals S28 which in the embodiments both have positive going polarity. For instance, the early signals could be fed to the non-inverting input and the late signals to the inverting input of an operational amplifier serving as an integrator. At the output 30 of the integrator, a main signal S30 occurs in the form of a signal level that is variable by the early and late signals. This main signal S30 can be derived directly at an output terminal 31 through an evaluating circuit such as a meter and used as a measurement for the sonic velocity c of a medium flowing through the channel 1. In addition, this main signal S30 is passed to an input of a summing circuit such as an adder 32.

The early and late signals S27 and S28 are additionally fed to a second row 33 of logic elements, which also have fed to them the downstream and upstream signals S21 and S22. In this way early upstream signals S34, early downstream signals S35, late upstream signals S36 and late downstream signals S37 are obtained at four outputs 34 to 37. A second integrating signal level generator such as an integrator 38 is fed with the early downstream signals S35 with positive sign and the early upstream signals S34 with negative sign and possibly also the late downstream signals S37 with negative sign and the late upstream signals S36 with positive sign. As a result, an auxiliary signal S39 is produced at the output 39 in the form of a signal level dependent on the signals S34 to S37.

This auxiliary signal S39 is fed directly to an output terminal 40 from which the flow velocity v of the medium flowing in the channel 1 can be taken directly through an evaluating circuit. In addition, the auxiliary signal S39 is fed through a switch 41 alternately to the positive and the negative second input of the summating circuit or adder 32. The switch 41 which may be an analog switch is operated by the downstream and upstream signals S21 and S22. Control signals S43 and S44 therefore alternately occur at the output 42 of the adder, these signals corresponding to the sum of or difference between, respectively, the main signal S30 and the auxiliary signal S39. These control signals S43 and S44 control the voltage-controlled oscillator 14 in such a way that the pulse train S15 alternately has a higher frequency $f_1$ associated with the downstream measurement and a lower frequncy $f_2$ associated with the upstream measurement.

This results in the method of operation to be described hereinafter in conjunction with FIG. 11. Entered in the five rows 1 – 5 on a time reference there are the transmission signal S17, the arrival signal S11 occurring after the transit time $t_1$, and the reference signal S13 occurring after a delay period $t_r$ which may be greater than or less than $t_1$ for the downstream measurement as well as for the upstream measurement. There is also an indication as to whether the main signal S30, the auxiliary signal S39 and the control signals S43 and S44 are increasing, decreasing or remaining unchanged.

Case 1: It is assumed that all arrival signals S11 occur earlier than the reference signal S13. The result of this is that the level integrator 29 merely receives positive signals and the main signal S30 increases. On the other hand, positive and negative signals are alternately fed to the second integrator 38 so that the auxiliary signal S39 remains unchanged. Consequently both control signals S43 and S44 increase. The frequencies $f_1$ and $f_2$ of the pulse trains from the VCO 14 increase. The delay period $t_r$ is therefore decreased in both transmission directions because the 256 impulses were on each occasion counted in a shorter period of time by the counter 16. During the respective next upstream or downstream measurement, therefore, the delay period $t_r$ has been more closely adapted to the actual transit time $t_1$. Since this procedure is repeated for each measurement, there is ultimate coincidence between the delay period and the transit time or, stated in other words, the frequencies $f_1$ and $f_2$ are a measure of or are proportional to the actual transit time $t_1$.

Case 2: All arrival signals S11 occur later than the associated reference signals S13. Exactly the opposite conditions to those in Case 1 occur. The main signal S30 decreases. The auxiliary signal S39 remains unchanged. The control signals S43 and S44 both become smaller. The frequencies $f_1$ and $f_2$ both decrease.

Case 3: During the downstream measurement the arrival signal S11 occurs earlier than the reference signal S13 and during the upstream measurement it occurs later. In this case the integrator 29 is alternately supplied with positive and negative signals so that the main signal S30 remains unchanged. On the other hand the second integrator 38 is only supplied with positive signals. Consequently the auxiliary signal S39 increases. As a result the control signal S43 and thus the frequency $f_1$ increase but the control signal S44 and thus the frequency $f_2$ decrease.

Case 4: The arrival signals S11 occur later than the reference signals S13 during the downstream measurement but earlier during the upstream measurement. The circumstances are the reverse of those in Case 3. This means that the frequency $f_1$ drops and the frequency $f_2$ rises.

Case 5: All arrival signals S11 coincide with the reference signals S13. The signal level generators 29 and 38 receive no signal. The main signal S30 and auxiliary signal S39 remain unchanged, as do the frequencies $f_1$ and $f_2$. This is an ideal condition which in practice almost never occurs.

The circuit therefore forms a regulating circuit in which solely by the statistical evaluation of the early and late signals during the upstream and downstream measurement an adjustment of the delay period $t_r$ occurs in such a way that the latter accurately coincides with the transit time $t_1$ after a few individual measurements. This regulation takes place with a relatively high accuracy independently of the quality of the components provided in the regulating circuit.

When the frequencies $f_1$ and $f_2$ occur by summation and subtraction of the main signal S30 and auxiliary signal S39, a simple calculation will show that the main signal S30 is a relatively accurate measure of or proportional to the mean value $(f_1 + f_2)/2$ and the auxiliary signal S39 is a relatively accurate measure of or proportional to half the difference $(f_1 + f_2)/2$ of the two frequencies $f_1 + f_2$. However, since this mean value is proportional to the sonic velocity of the medium flowing in the channel 1 and the difference is proportional to the flow velocity of this medium, one can connect output terminals 31 and 40 directly to the outputs 30 and 39 to derive signals corresponding to the sonic velocity c and flow velocity v, respectively. These signals may have an extraordinarily high accuracy because they can be derived directly from the self-compensating regulating circuit.

Figure 8:
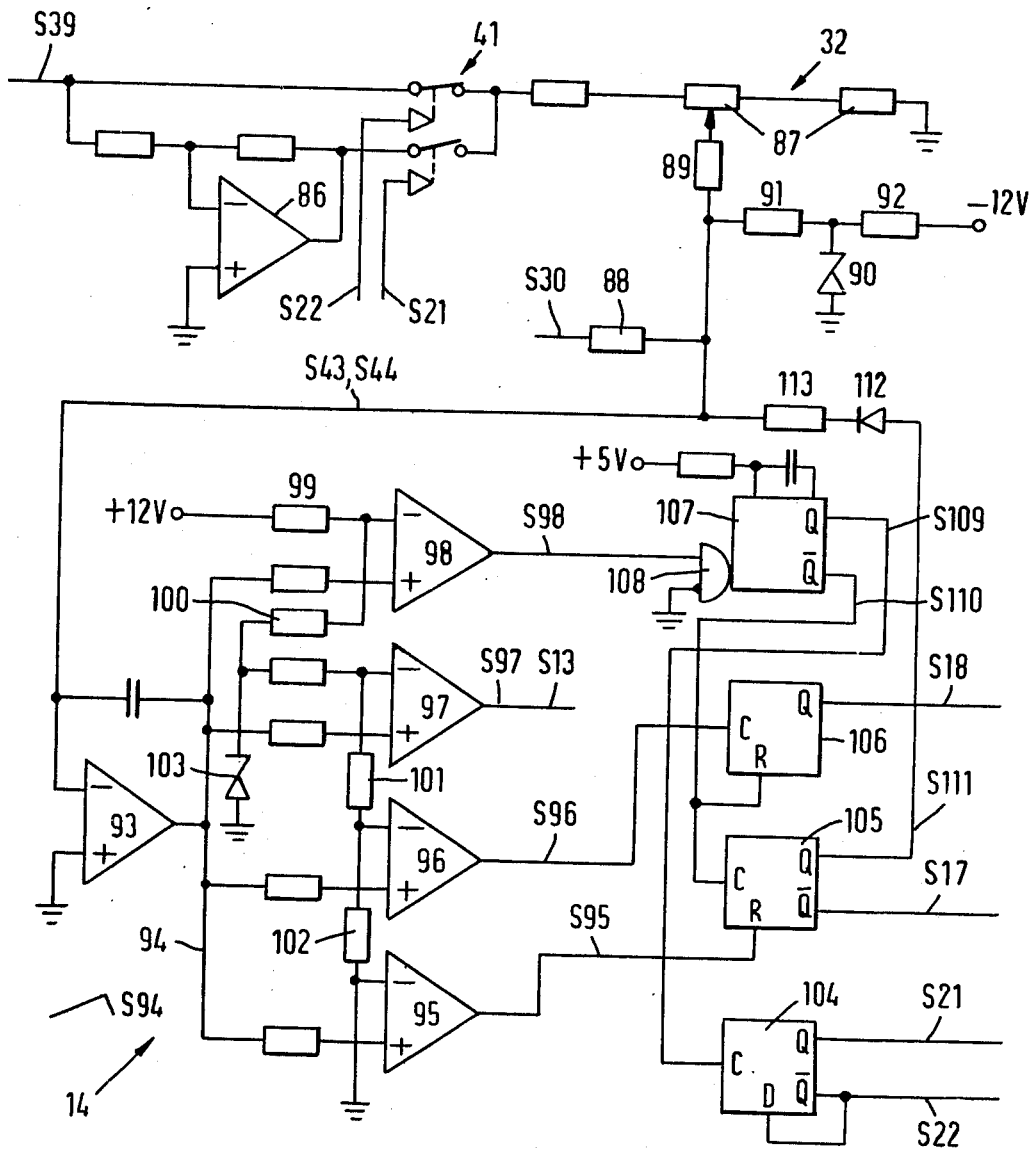
FIG. 8 is an alternative embodiment of part of the circuit of FIG. 1 using an analog time base.

Instead of the time generator consisting of the oscillator 14 and counter 16, one can also use an analog time generator such as is illustrated in FIG. 8 and described hereinafter.

FIG. 2 shows a modification of the solution according to FIG. 1, in which the signals S34 and S37 feed two signal level generators or integrators 43 and 44 in such a way that the integrator 43 is fed with the early upstream signal S34 of positive sign and the late upstream signal with negative sign and the integrator 44 is fed with the early downstream signal S35 with positive sign and the late downstream signal S37 with negative sign. At the output 45 of the integrator 44 a main signal S45 occurs which is applied to the one input of the summating circuit 32. At the output 46 of the integrator 43 there occurs an auxiliary signal S46 which can be applied to the other input of the summating circuit 32 through a switch 47 that is again controlled by the signal direction generator 20. The output terminal 40 from which a quantity corresponding to the flow velocity v is derivable is connected to the output 46 of the integrator 43.

Let one assume that the switch 47 is open during the downstream measurement. The control signal S43 then corresponds to the main signal S45 during the open period. The latter changes in dependence on whether the voltage signal integrator 44 is fed with early downstream signals or late downstream signals. If only the integrator 44 is included in the regulating circuit, the main signal S45 therefore corresponds to the frequency $f_1$ for the downstream measurement.

If during the upstream measurement the switch 47 is closed, the auxiliary signal S46 is added to the main signal S45. The auxiliary signal changes in dependence on whether the integrator receives early upstream signals or late upstream signals. Since during this measurement the control signal S44 is set to a value corresponding to the frequency $f_2$, the auxiliary signal S46 must correspond to the difference $f_1 - f_2$. A signal proportional to the flow velocity v can therefore again be obtained in this way with high accuracy.

Figure 3:
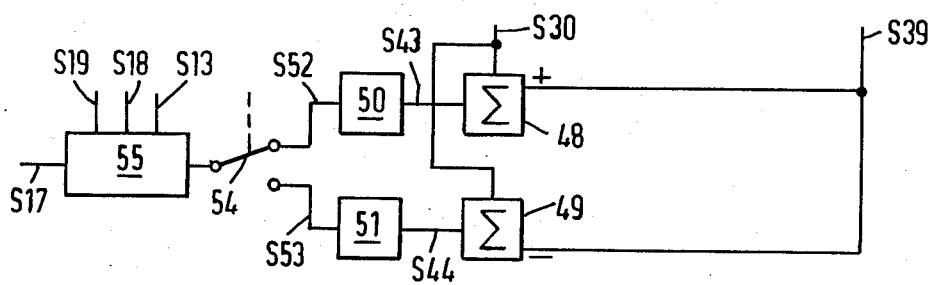
FIG. 3 is a further modification of the circuit.

In the embodiment according to FIG. 3 there is shown another modification of the circuit according to FIG. 1. Here the main signal S30 and the auxiliary signal S39 are fed to two summating circuits 48 and 49 in such a way that the control signal S43 is constantly produced by the sum and the control signal S44 by the difference. The voltage-controlled oscillators 50 and 51 are supplied with these control signals and constantly deliver impulses S52 of the frequency $f_1$ or impulses S53 of the frequency $f_2$, respectively. A switch 54 controlled by the signal direction generator 20 applies these impulse chains alternately to a common counter 55 corresponding to the counter 16.

FIG. 4 shows an example of the FIG. 1 control circuit in more detail, in which instead of the reference numerals for the lines there are in some cases only the reference numerals for the signals occurring therein. The first row 26 of logic elements consists of two AND elements 56 and 57 and the second row 33 of logic elements of four AND elements 58 to 61. The signal level generator 29 comprises an amplifier 62 having all late signals S28 fed to its non-inverting input and all early signals S27 to its inverting input. This amplifier is followed by an integration amplifier 63 from the output of which the main signal S30 is derivable. The signal level generator 38 comprises an amplifier 64 having the early upstream signals S34 applied to its non-inverting input and the early downstream signals to its inverting input. A correcting circuit 65 permits the inverting input of the amplifier 64 also to be fed with the late upstream signals S36 and the non-inverting input with the late downstream signals S37. The amplifier 64 is followed by an integration amplifier 66 from the output of which the auxiliary signal S39 is derivable.

In the embodiment according to FIG. 5 the early upstream signals S34 are fed to the non-inverting input of the amplifier 64 and the early downstream signals to the inverting input of this amplifier. The output of the amplifier is again connected to the inverting input of the integration amplifier 66. The late upstream signals S36 are fed to the inverting input of a further amplifier 67 and the late downstream signals S37 to the non-inverting input of this amplifier. The amplifier output feeds an integration amplifier 68 of which the output is fed to the non-inverting input of the integration amplifier 66. Here, too, the auxiliary signal S39 can be derived from the output of the integration amplifier 66.

Figure 6:
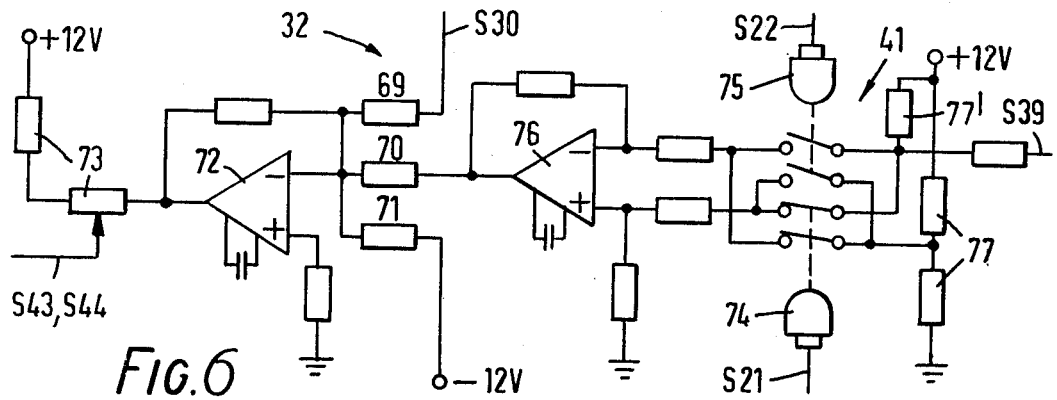
FIG. 6 is part of the circuit containing the summating element and the switch.

FIG. 6 shows an embodiment of the summing circuit 32 together with the switch 41 according to FIG. 1. The summating circuit 32 comprises a first resistance 69 through which the main signal S30 is fed, a second resistance 70 through which the processed main signal S39 is fed, and a summing bias resistor 71. The summation signal is amplified in an amplifier 72. The amplifier output is applied through a potentiometer 73 to a voltage of +12V, so that the control signals S43, S44 which can be tapped at the potentiometer 73 can receive an additional setting for fixing the operating range.

The switch 41 consists of two electronic switch elements 74 and 75 which are made alternately operative by the downstream signals S21 and the upstream signals S22. The auxiliary signal S39 is consequently alternately fed to the inverting and the non-inverting input of an amplifier 76, whilst the respective other input of the amplifier 76 is supplied with a fixed voltage tapped from a voltage divider 77 and 77'. The switched signals S39 is biased by the resistor 77' to the same voltage level as the fixed voltage. The unnumbered blocks in the figures represent various gain setting resistors.

Figure 7:
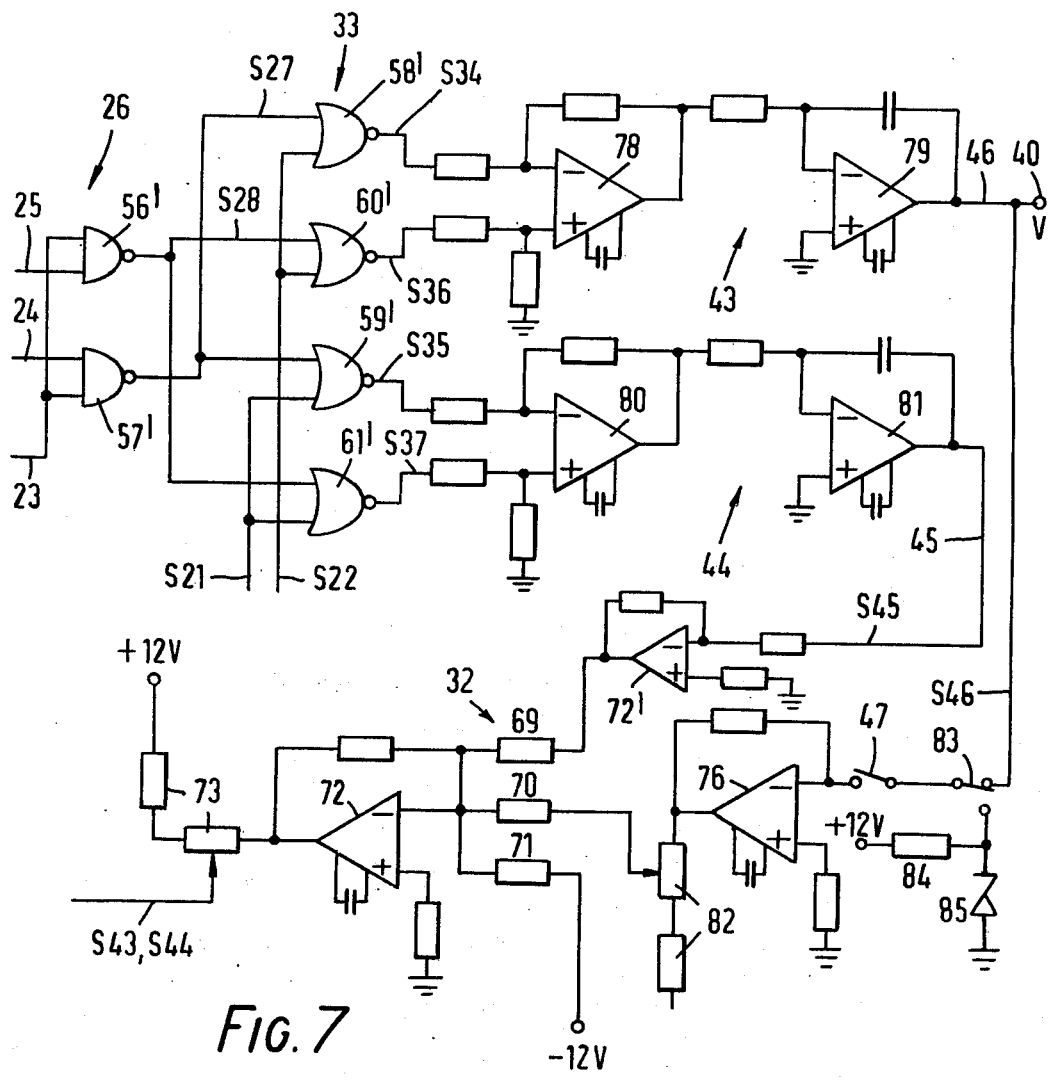
FIG. 7 shows the control circuit, switch and summating circuit for the FIG. 2 embodiment.

FIG. 7 shows details of the circuit according to FIG. 2, the components to some extent corresponding to those of FIGS. 4 and 7. The first row 26 of logic elements is provided with NAND-elements 56' and 57', the second row 33 is provided with NOR-elements 58', 59', 60' and 61'.

The signals S34 and S37 derivable from the second row 33 of logic elements 58' to 61' are here evaluated as follows. The early upstream signals S34 are fed to the inverting input of an amplifier 78 and the late upstream signals S36 to the non-inverting input of this amplifier. The amplifier 78 output feeds an integration amplifier 79 from the output of which the auxiliary signal S46 is derivable. The early downstream signals S35 are fed to the inverting input of an amplifier 80 and the late downstream signals S37 to the non-inverting input of this amplifier. The amplifier output feeds an integration amplifier 81 from the output of which the main signal S45 is tapped. Main signal S45 is passed through a unity gain inverting amplifier 72' to summing circuit 32 for logic purposes. During each upstream measurement, the auxiliary signal S46 is transformed through the amplifier 76 and tapped at a potentiometer 82. The control signal S43 therefore corresponds to the main signal S45 or the frequency $f_1$ and the control signal S44 to the difference between the main signal S45 and auxiliary signal S46 or the frequency $f_2$.

With the aid of the amplifier 76 in FIGS. 6 and 7 or the voltage divider 82 in FIG. 7, the auxiliary signal S39 or S46, respectively, can be proportionally reduced by the value occurring at the output of the respective voltage level generator 38 (FIG. 1) or 43. This means that at the outputs 39 or 46 of this voltage level generator there occur auxiliary signals which are sharply increased as compared with the values of the main signals S30 and S45, thereby providing larger amplitude signals at the output terminal 40 which increases the accuracy of the readout.

For the calibration of the apparatus, switch 83 may be used to apply a known constant voltage level to the inverting input of amplifier 76. The constant voltage level is provided by a resistor 84 and a Zener diode 85. This voltage level simulates a definable value for the auxiliary signal S46 corresponding to a definable flow velocity. To effect this calibration, first the potentiometer 73 is adjusted until the output levels S43, S44 correspond to the mean sound velocity. Next the switch 83 is switched to apply the known voltage and the potentiometer 82 is adjusted. For example, the signal S15 (FIG. 1) can be fed to a measuring device and the potentiometer 82 can be adjusted until the period of the VCO will have a value corresponding to the defined flow velocity plus mean sound speed.

In FIG. 8 another circuit is shown according to which the reference signal S13, the transmission signal S17, the receiver readiness signal S18 as well as the downstream signal S21 and the upstream signal S22 of FIG. 1 are produced by the main signal S30 and the auxiliary signal S39.

The auxiliary signal S39 is inverted in an inverting amplifier 86 having the amplification factor of one. The non-inverted and the inverted auxiliary signal S39 is fed alternatively to the summing circuit 32 by means of the switch 41 which is constructed as an analog switch being controlled from the downstream and upstream signals S21 or S22, respectively. A potentiometer 87 serves to set the magnitude of the auxiliary signal S39 to be entered into the summing circuit 32. The main signal S30 is fed through resistor 88, the auxiliary signal S39 is fed through a resistor 89. A Zener diode 90 in connection with resistances 91 and 92 serves to produce a summing bias voltage.

The timing generator 14 includes an analog time base in the present example. For such purpose, the control signals S43 and S44 from the summing circuit 32 were fed to an integrator 93 at the output line 94 of which a gradually increasing signal S94 appears, therefore, until switching back takes place which is described later. Said signal S94 is fed to the non-inverting input of four comparators 95 – 98. The inverting inputs of said comparators are connected to a voltage divider which is formed by the resistors 99 – 102 and a Zener diode 103. Therefore, the comparators deliver a corresponding output signal S95, S96, S97 and S98 at different instants depending upon when the rising signal S94 reaches the bias voltage of each.

These output signals S95 – S98 actuate three D-flipflops 104, 105 and 106 as well as a monostable multivibrator 107. The signal S96 is fed to the C-input of flipflop 106. Therefore, the receiver readiness signal S18 appears at the Q-output. Sometime later the signal S97 which could be used directly as reference signal S13, appears at comparator 97. Again some time later signal S98 appears which is applied to one input of an AND-element 108 the other inhibit input of which is connected to a point of reference potential. The monostable multivibrator 107, which is triggered by the appearance of signal S98, therefore produces at its output Q a signal S109 which is applied to the C-input of flipflop 104 which therefore effects a switching from downstream signal S21 to upstream signal S22 or vice versa. At the end of a predetermined delay time a signal S110 appears at the Q-output of the monostable multivibrator 107, which is applied on the one hand to the R-input of flipflop 106 and therefore finishes the receiver readiness signal S18 and on the other hand to the C-input of flipflop 105. This provides a signal S111 at the Q-output which is applied through a diode 112 and a resistor 113 to the input of the integrator 93. Said signal has such polarity that the output signal S94 decreases quickly to zero. As soon as the comparator 95 detects that zero level is reached, signal S95 is applied to the R-input of flipflop 105 to reset the flipflop. Starting from this moment, integrator 93 is fed again by one of the signals S43 or S44, respectively, and at the Q-output of flipflop 105 the transmission signal S17 appears. Now a new cycle starts.

Figure 9:
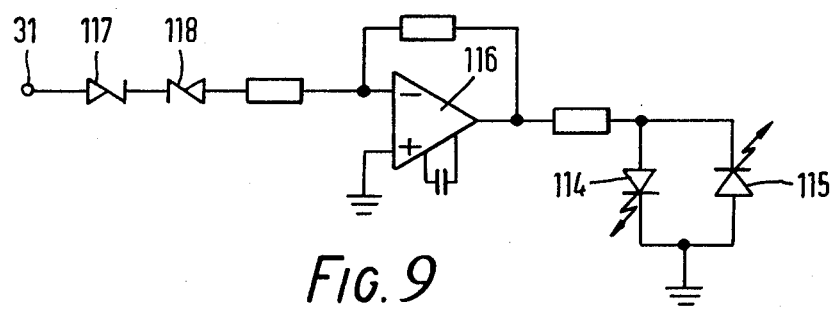
FIG. 9 is an indicating circuit for deviations in the sonic velocity.

FIG. 9 shows an indicator apparatus with two back to back incandescent diodes 83 and 84 which are connected from the output of an amplifier 85 to ground. The one amplifier input is connected to the connecting terminal 31 for the sonic velocity c through a bipolar voltage reference diode in the form of the series circuit of Zener diodes 86 and 87 of opposite polarity. As soon as the voltage at the output terminal 31 exceeds the blocking voltage in the one or other direction, one or other incandescent diode lights up depending on the voltage direction so as to indicate that the set operating range of the apparatus is exceeded. The permissible operating range can then for example be reset by adjusting the potentiometer 73.

Figure 10:
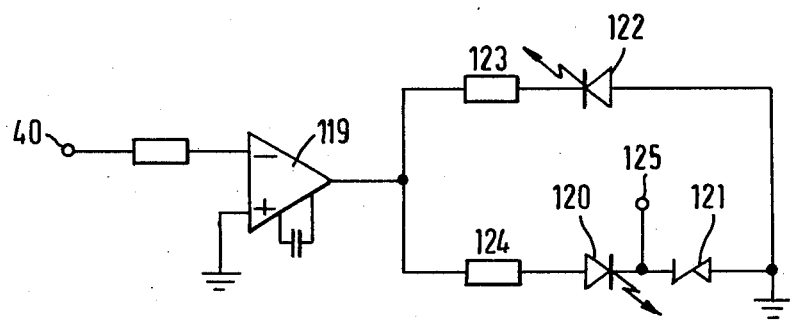
FIG. 10 is a circuit for indicating the flow direction.

FIG. 10 relates to an indicating apparatus for the flow direction. Connected to the output terminal 40 for the flow velocity v there is the one input of an amplifier 88 of which the output is applied to earth through the series circuit of an incandescent diode 89 and a Zener diode 90 both in shunt with an incandescent diode 91, in each case with the corresponding current limiting resistors 93 and 94. Downstream flow produces a positive signal at the terminal 40 and thus a negative voltage at the amplifier 88 output. The incandescent diode 91 therefore lights up. On reverse flow a positive voltage occurs at the amplifier output so that the incandescent diode 89 lights up and a reverse flow signal is derivable at an output 92 between the incandescent diode 89 and Zener diode 90.

It is also possible to adjust the apparatus with the aid of this indicator circuit. By reason of the rapid response or tracking of the circuit and the omitted feedback at the amplifier 88, positive and negative voltages occur alternately at the output of the amplifier at zero flow velocity, whereby the incandescent diodes 89 and 91 light up alternately in rapid sequence. For the purpose of adjustment one can therefore interrupt the flow and effect compensation until the incandescent diodes uniformly light up alternately to indicate zero flow.

In the examples the individual amplifier are operational amplifiers which are possibly adapted for their particular purpose by ohmic or capacitive feedbacks. The signals S30, S39, S43 to S46 are analog signals, the signals S21, S22 are binary quantities 1 or 0 of substantially the same duration, and S23, S27, S28, and S34 to S37 are binary quantities 1 or 0 of substantially the same duration and amplitude. The other signals, apart from the ultrasonic signal of high frequency, are impulses or likewise binary signals. The various unnumbered blocks in the drawings depict gain setting resistors necessary for the proper functioning of the integrated circuits.

The arrival signal S11 need not be compared directly with the reference signal S13; in some cases it is preferable to use a corrected reference signal which is slightly delayed with respect to the reference signal S13 as described in U.S. Pat. No. 3,780,577.

The several circuit components herein described are of conventional design and available commercially as off-the-shelf items. By way of example the transmission device 6 is simply a pulse generator which is capable of shock exciting the transducer 3. In like manner the receiver means 9 is a pulse amplifier capable of amplifying the high frequency pulse trains device from the receiving transducer 4. The switch 10 can be any suitable transistor switching circuitry. The comparator 12 may be of the type described in U.S. Pat. No. 3,780,577, which receives the transmitted pulse trains and compares it in time phase with the reference signal and provides output signals indicative of whether the received signals are early or late with respect to the reference signal.

The voltage controlled oscillator is of a well known design, but, for example, may be in an integrated circuit ICL8038.

The operational amplifier used in the various logic circuitry may be for the most part 301A's. The various and/or logic and NOR/NAND logic can be integrated circuits of the 7400 series. The analog switches may be CA4016 circuit chips.

In like manner the bistable transmission generator 20 may be an element similar to that described in conjunction with the U.S. Pat. No. 3,780,577.

In its simplest form it may be a bistable multivibrator or flipflop and the counter 16 may be a conventional binary counter with suitable dividers. The remaining elements of the circuit depicted, particularly by clocks 26, 33, 38, 29, and 41, are all described in detail in the remaining figures of the description of the drawing and for the most part conventional operational amplifier circuits; they are available from many sources.

A relatively stable integration circuit may be made utilizing an integrator circuit up-down counter, and the up-down counter has inputs that are derived in one instance from the early and late signals and in the other instance from the upstream and downstream signals correlated according to time of arrival such that the counter will count up on the receipt of downstream time correlated signals and conversely will count down upon the receipt of the upstream time correlated signals. The binary output of the counter is applied to a conventional digital analog converter which provides, as is known, an analog voltage which may be used directly to control, through suitable switching circuitry, the voltage controlled oscillator.

We claim:

1. In apparatus for the measurement of fluid flow rate using ultrasonic signals, said apparatus having first and second transducers positioned in relative upstream and downstream locations in communication with the fluid to be measured for alternately transmitting said ultrasonic signals in opposite senses therebetween, the combination comprising:
    a timing generator for controlling the transmission times of said ultrasonic signals and generating a reference signal delayed with respect to each said transmission time,
    comparator means for generating early and late signals according to whether the received ultrasonic signals are early or late relative to each said reference signal,
    a first signal level generator responsive to at least some of said early and late signals for generating a first signal level related to sound speed in said fluid,
    logic means responsive to said comparator means and to the sense of transmission of said ultrasonic signals for generating early and late signals correlated with transmission direction upstream and downstream,
    a second signal level generator responsive to at least two of said early and late signals correlated with transmission direction for generating a second signal level different than said first level related to said fluid flow rate, and
    adder means responsive to said first and second signal levels for generating control signals related respectively to the upstream and downstream speeds of sound for controlling the timing of said timing generator.

2. Apparatus according to claim 1 wherein said second signal level generator is responsive to said late upstream and downstream signals.

3. Apparatus according to claim 1 wherein said second signal level generator is responsive to said late upstream and said early downstream signals.

4. Apparatus according to claim 1 wherein said second signal level generator is responsive to said early upstream and said early downstream signals.

5. Apparatus according to claim 1 wherein said second signal level generator is responsive to said early and said late downstream signals.

6. Apparatus according to claim 1 wherein said timing generator provides an output signal level, the transmission times and the delay times of said reference signal being a function of the amplitude of said output signal level.

7. Apparatus according to claim 1 which includes means for proportionally reducing the amplitude of said second signal level.

8. Apparatus according to claim 1 wherein one of said control signals is formed by adding said first and second signal levels and the other of said control signals is formed by subtracting said first and second signal levels.

9. Apparatus according to claim 1 wherein the first signal level generator comprises an integrator for receiving early signals of one sign and late signals of the opposite sign at its input associated with one of the transmission directions, and that the second signal level generator comprises an integrator for receiving early signals of one sign and late signals of the opposite sign at its input associated with the other transmission direction.

10. Apparatus according to claim 1 which includes switch means responsive to transmission direction for effecting different delay times for said reference signals for each of said transmission directions.

11. Apparatus according to claim 10 wherein said adder means includes
    a first adder for adding said first and second signals,
    a second adder for subtracting said first and second signals, said switch means being coupled between said first and second adders and said timing generator.

12. Apparatus according to claim 10 wherein the first signal level generator comprises a first integrator coupled to receive at its input all early signals of both transmission directions of one sign and all late signals of both transmission directions of the opposite sign, and that the second signal level generator comprises a second integrator coupled to receive at its input the early signals and late signals of both transmission directions, the signals of one transmission direction having one sign and the signals of the other transmission direction having the opposite sign.

13. Apparatus according to claim 12 wherein the second level generator comprises a correcting means in which the early signals and the late signals of the one transmission direction have the early signals and the late signals of the other transmission direction added to them before they are fed to the second integrator.

14. Apparatus according to claim 13 wherein said logic means is coupled to the input circuit of said first integrator and to the input of a row of four logic elements which can additionally be fed with upstream or downstream signals in such a way that their outputs are associated alternatively with the early signals of the one transmission direction, the early signals of the other transmission direction, the late signals of the one transmission direction and the late signals of the other transmission direction.

15. Apparatus according to claim 12 wherein said logic means is coupled to the input circuit of said first integrator and to the input of a row of four logic elements which cn additionally be fed with upstream or downstream signals in such a way that their outputs are associated alternatively with the early signals of the one transmission direction, the early signals of the other transmission direction, the late signals of the one transmission direction and the late signals of the other transmission direction.

16. Apparatus according to claim 10 wherein the second signal level generator comprises a main integrator and an additional integrator, wherein the additional integrator is coupled to receive one of said pairs of early signals and late signals of both transmission direction, the main integrator is coupled to receive the other of said pairs of early and late signals of both transmission directions, and the output of the additional integrator is connected to one input of the main integrator.

17. Apparatus according to claim 10 which includes an amplifier connected to the output of the second signal level generator, a pair of incandescent diodes of opposite polarity connected in parallel between a point of reference potential and the output of said amplifier.

18. Apparatus according to claim 10 which includes a full wave voltage limiter connected to the output of the first signal level generator, an amplifier, the input of a pair of parallel connected incandescent diodes of opposite polarity connected between the output of said amplifier and a point of reference potential.

19. Apparatus according to claim 10 which includes means coupled to the output of said second signal level generator for providing normal and inverted outputs, and means for selectively adding said normal output to the output of said first generator during upstream flow and said inverted output during downstream flow.

20. A method of measuring fluid flow rate and velocity of sound propagation through a fluid utilizing at least one pair of first and second energy transducers capable of functioning as transmitters and receivers in communication with the fluid which comprises generating a transmit pulse, generating a reference pulse delayed in time to said transmit pulse, directing the transmit pulses alternately upstream and downstream of the flowing medium, receiving the transmitted pulses, comparing the phase of the received and reference pulses, generating logic signals in accordance with the early and late arrival of said received pulses relative to said reference pulses, obtaining the statistical average of all early and all late signals to provide a first signal level related to the sound speed in said medium, generating logic signals corresponding to the early and late arrival of signals relative to said reference signals correlated with the direction of transmission, obtaining the statistical average of at least one pair of early and late arrival signals to provide a second signal level related to fluid flow velocity of said medium, selectively subtracting and adding said first and second signal level for each of said upstream and downstream transmissions thereby to vary the delay time of said reference pulses for each of said upstream and downstream transmissions such that said reference pulses track the actual time of arrival of said transmitted pulses.

* * * * *